US006359647B1

(12) United States Patent
Sengupta et al.

(10) Patent No.: US 6,359,647 B1
(45) Date of Patent: Mar. 19, 2002

(54) AUTOMATED CAMERA HANDOFF SYSTEM FOR FIGURE TRACKING IN A MULTIPLE CAMERA SYSTEM

(75) Inventors: Soumitra Sengupta, Stamford, CT (US); Damian Lyons, Putnam Valley, NY (US); Thomas Murphy, Manchester, NH (US); Daniel Reese, Landisville, PA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/131,243

(22) Filed: Aug. 7, 1998

(51) Int. Cl.[7] .................................................. H04N 7/18
(52) U.S. Cl. ........................ 348/154; 348/143; 348/153; 348/159; 348/169
(58) Field of Search ................................. 348/143, 152, 348/153, 154, 159, 169; 382/103

(56) References Cited

U.S. PATENT DOCUMENTS 4,511,886 A * 4/1985 Rodriguez ................... 340/534
5,164,827 A * 11/1992 Paff ............................. 348/143
5,699,444 A * 12/1997 Palm ............................ 382/106
5,729,471 A * 3/1998 Jain et al. ..................... 348/13
5,745,126 A * 4/1998 Jain et al. ..................... 348/42
6,002,995 A * 12/1999 Suzuki et al. ................ 702/188

FOREIGN PATENT DOCUMENTS

| EP | 0529317 A1 | * 3/1993 | ............ H04N/7/18 |
| EP | 0714081 A1 | 5/1996 | ......... G08B/13/196 |
| JP | 08011071 A | * 1/1996 | .............. B25J/3/00 |
| WO | WO97/04428 | 2/1997 | ......... G08B/13/196 |

* cited by examiner

Primary Examiner—Vu Le

(57) ABSTRACT

The invention provides for the automation of a multiple camera system based upon the location of a target object in a displayed camera image. The preferred system provides a nearly continuous display of a figure as the figure moves about throughout multiple cameras' potential fields of view. When the figure approaches the bounds of a selected camera's field of view, the system determines which other camera's potential field of view contains the figure, and adjusts that other camera's actual field of view to contain the figure. When the figure is at the bounds of the selected camera's field of view, the system automatically selects the other camera. The system also contains predictive location determination algorithms. By assessing the movement of the figure, the system selects and adjusts the next camera based upon the predicted subsequent location of the figure.

18 Claims, 9 Drawing Sheets

AUTOMATED CAMERA HANDOFF SYSTEM FOR FIGURE TRACKING IN A MULTIPLE CAMERA SYSTEM

BACKGROUND OF THE INVENTION

1. Field of the Invention

This invention relates to a system for controlling multiple video cameras. This invention allows for an automated camera handoff for selecting and directing cameras within a multi-camera system, as might be used in a security system or a multi-camera broadcasting system. The automation is provided by tracking a figure within the image from an individual camera, coupled with an area representation of the fields of view of each of the other cameras.

2. Description of Related Art

Security systems for airports, casinos, and the like typically employ a multitude of cameras that provide images of selected areas to a control station. The images from each of these cameras, or a subset of these cameras, are displayed on one or more monitors at the control station. The operator of the control station is provided an ability to select any one of the cameras for a display of its image on a primary monitor, and, if the camera is adjustable, to control of the camera's field of view. Such control systems are also utilized for selecting from among multiple cameras at an event being broadcast, for example, multiple cameras at a sports arena, or studio.

The selection and control of the cameras is typically accomplished by controlling a bank of switches, or by selecting from amongst a list of cameras on a computer terminal. To view a particular area, the operator selects the camera associated with that area. If the camera is adjustable, the operator subsequently adjusts the selected camera's field of view by adjusting its rotation about a horizontal axis (pan) or vertical axis (tilt), or its magnification (zoom). The entire span of an adjustable camera's span of view is termed herein as the camera's potential field of view, whereas the view resulting from the particular pan, tilt, and zoom settings is termed the camera's actual field of view.

Image processing algorithms are available which allow for the identification of a particular pattern, or figure, within an image, and the identification of any subsequent movement of that figure. Coupled with a security control system, such image processing algorithms allow for the automated adjustment of a camera so as to keep the figure in the center of the cameras actual field of view. When the figure travels beyond the potential field of view of the camera, the operator selects another camera whose potential field of view contains the figure at its new location, adjusts the camera, identifies the figure in the camera's actual field of view, and thereafter continues the automated tracking until the figure exits that camera's potential field of view.

In the conventional camera selection scenario, the operator must be familiar with the layout of the secured area, as well as the correspondence between the displayed image and this layout. That is, for example, if a figure is seen exiting through one of several doorways, the operator must be able to quickly determine to which other area that particular doorway leads, and must further determine which camera includes that other area.

SUMMARY OF THE INVENTION

It is an object of this invention to provide for the automation of a multiple camera system, so as to provide for a multi-camera figure tracking capability. The preferred system will allow for the near continuous display of a figure as the figure moves about throughout the multiple cameras' potential fields of view.

The approximate physical location of a figure is determined from the displayed image, the identification of the figure within this image by the figure tracking system, and a knowledge of the camera's location and actual field of view which is producing the displayed image. If the figure exits a selected camera's field of view, another camera containing the figure within its field of view is selected. The bounds of each camera's potential field of view are contained in the system. The system determines which cameras' potential fields of view contain the figure by determining whether the figure's determined physical location lies within the bounds of each camera's field of view.

In a preferred embodiment, when the figure approaches the bounds of the selected camera's potential field of view, the system determines which other camera's potential field of view contains the figure, then adjusts that other camera's actual field of view to contain the figure. When the figure is at the bounds of the selected camera's field of view, the system automatically selects an other camera and communicates the appropriate information to the figure tracking process to continue the tracking of the figure using this other camera.

In a further embodiment of the invention, the system also contains predictive location determination algorithms. By assessing the movement of the figure, the selection and adjustment of the next camera can be effected based upon the predicted subsequent location of the figure. Such predictive techniques are effective for tracking a figure in a secured area in which the cameras' fields of view are not necessarily overlapping, and also for selecting from among multiple cameras containing the figure in their potential field of view.

By associating the displayed image to the physical locale of the secured area, the operator need not determine the potential egress points from each camera's field of view, nor need the operator know which camera or cameras cover a given area, nor which areas are adjacent each other.

In another embodiment, the selection of a target is also automated. Security systems often automatically select a camera associated with an alarm, for the presentation of a view of the alarmed area to the operator. By associating a target point with each alarm, for example the entry way of a door having an alarm, the system can automatically select and adjust the camera associated with the alarm to contain that target point, and identify the target as those portions of the image which exhibit movement. Thereafter, the system will track the target, as discussed above.

DESCRIPTION OF THE PREFERRED EMBODIMENTS

Figure 1:
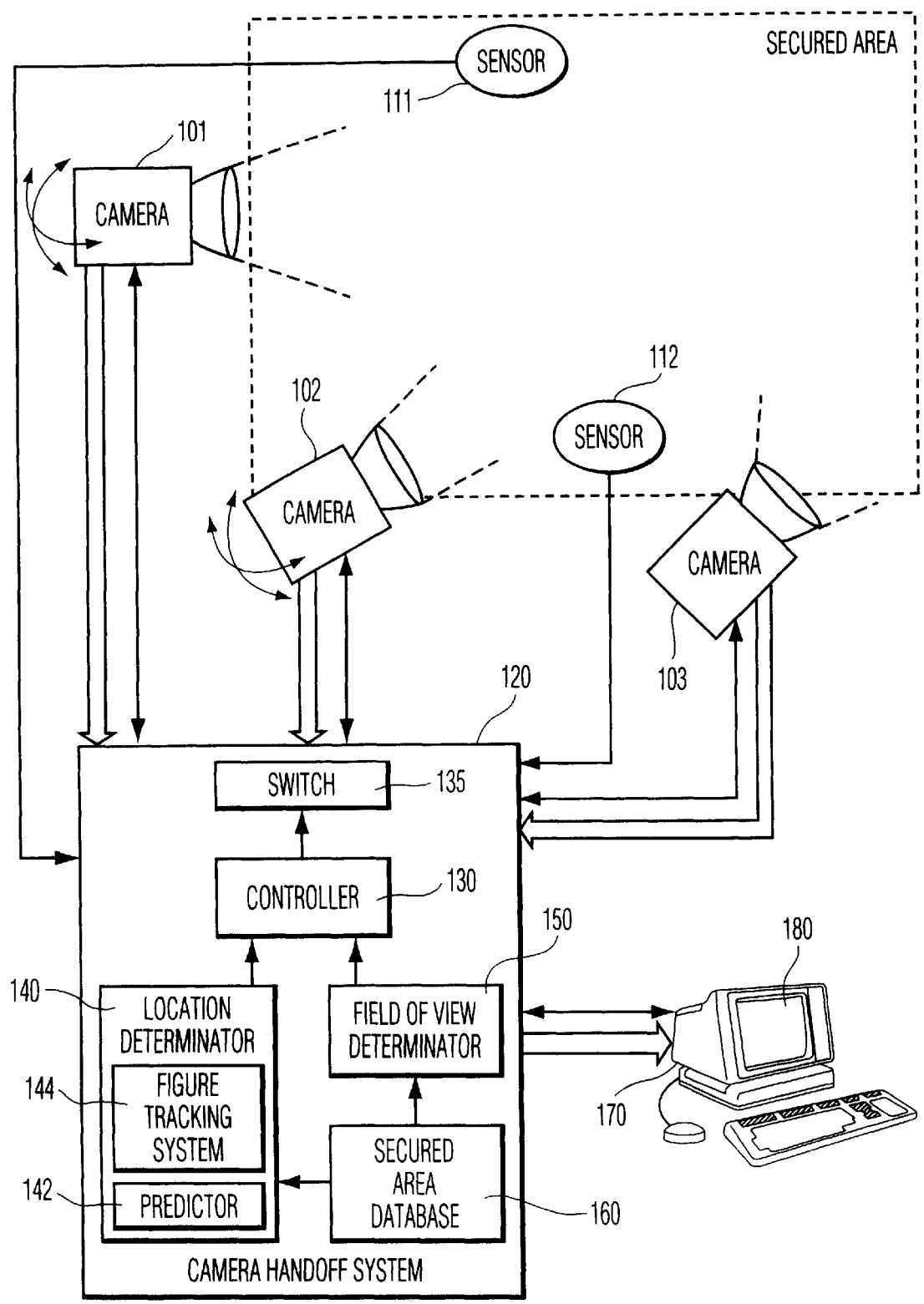
FIG. 1 illustrates an example multi-camera security system in accordance with this invention.

FIG. 1 illustrates a multi-camera security system. The system comprises video cameras 101, 102, 103 and 104–106 (shown in FIG. 2). Cameras 101 and 102 are shown as adjustable, pan/tilt/zoom, cameras. The cameras 101, 102, 103 provide an input to a camera handoff system 120; the connections between the cameras 101, 102, 103 and the camera handoff system 120 may be direct or remote, for example, via a telephone connection. In accordance with this invention, the camera handoff system 120 includes a controller 130, a location determinator 140, and a field of view determinator 150. The controller 130 effects the control of the cameras 101, 102, 103 based on inputs from the sensors 111, 112, the operator station 170, and the location determinator 140 and field of view determinator 150.

An operator controls the security system via an operator's station 170, and controller 130. The operator typically selects from options presented on a screen 180 to select one of the cameras 101, 102, 103, and controls the selected camera to change its line of sight, via pan and tilt adjustments, or magnification factor, via zoom adjustments. The image from the selected camera's field of view is presented to the operator for viewing via the switch 135.

The optional alarm sensors 111, 112 provide for automatic camera selection when an alarm condition is sensed. Each alarm sensor has one or more cameras associated with it; when the alarm is activated, an associated camera is selected and adjusted to a predefined line of sight and the view is displayed on the screen 180 for the operator's further assessment and subsequent security actions.

Figure 2:
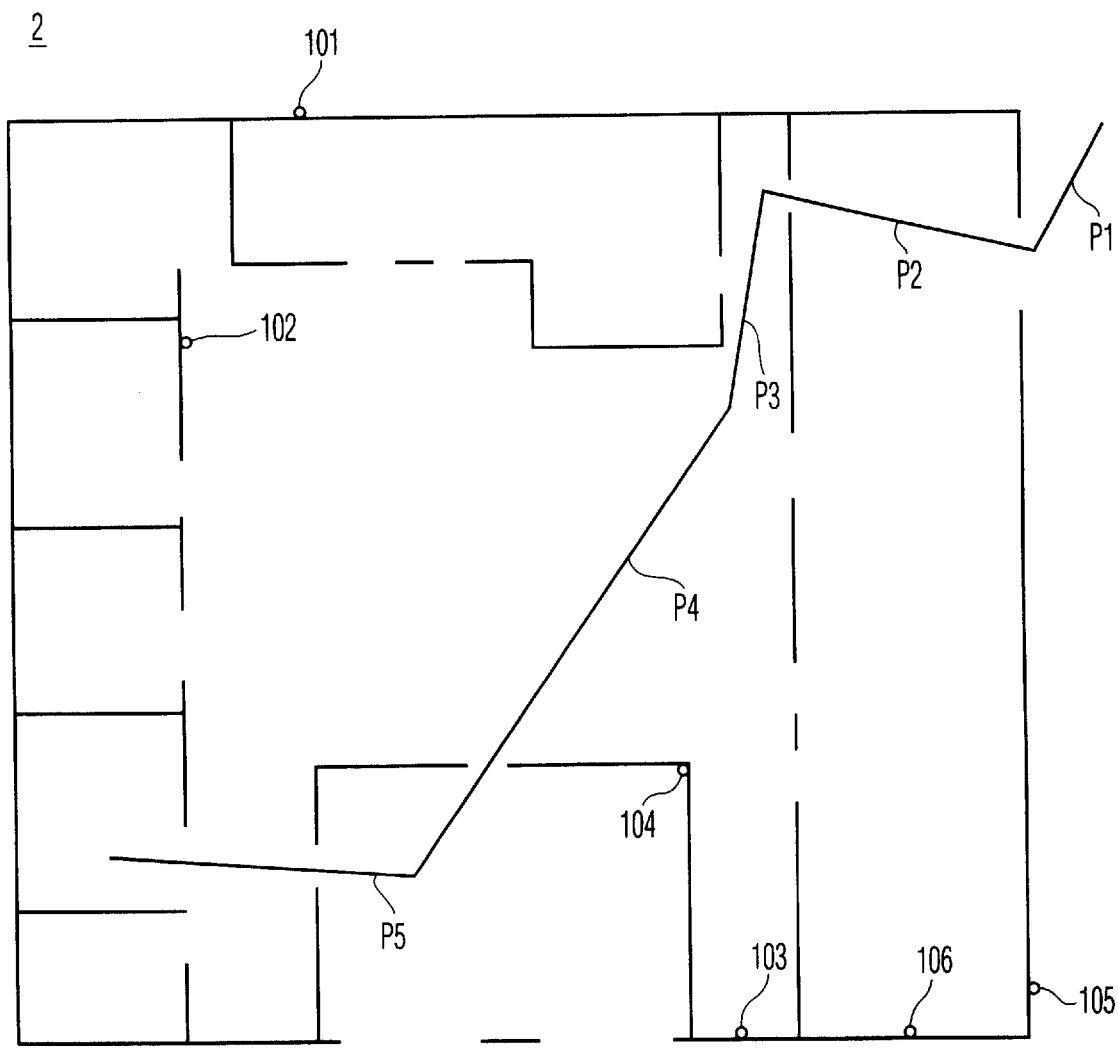
FIG. 2 illustrates an example graphic representation of a secured area with a multi-camera security system, in accordance with this invention.

The field of view determinator 150 determines the field of view of each camera based upon its location and orientation. Non-adjustable camera 103 has a fixed field of view, whereas the adjustable cameras 101, 102 each have varying fields of view, depending upon the current pan, tilt, and zoom settings of the camera. To facilitate the determination of each camera's field of view, the camera handoff system 120 includes a database 160 that describes the secured area and the location of each camera. The database 160 may include a graphic representation of the secured area, for example, a floor plan as shown in FIG. 2. The floor plan is created and entered in the control system when the security system is installed, using for example Computer Aided Design (CAD) techniques well known to one skilled in the art. Each wall and obstruction is shown, as well as the location of each of the cameras 101–106.

The location determinator 140 determines the location of an object within a selected camera's field of view. Based upon the object's location within the image from the selected camera, and the camera's physical location and orientation within the secured area, the location determinator 140 determines the object's physical location within the secured area. The controller 130 determines which cameras' field of view include the object's physical location and selects the appropriate camera when the object traverses from one camera's field of view to another camera's field of view. The switching from one camera to another is termed a camera handoff.

In a preferred embodiment, the camera handoff is further automated via the use of figure tracking system 144 within the location determinator 140. In FIG. 2, line segments P1 through P5 represent the path of a person (not shown) traversing the secured areas. The operator of the security system, upon detecting the figure of the person in the image of camera 105, identifies the figure to the figure tracking system 144, typically by outlining the figure on a copy of the image from camera 105 on the video screen 180. Alternatively, automated means can be employed to identify moving objects in an image that conform to a particular target profile, such as size, shape, speed, etc. Camera 105 is initially adjusted to capture the figure, and the figure tracking techniques continually monitor and report the location of the figure in the image produced from camera 105. The figure tracking system 144 associates the characteristics of the selected area, such as color combinations and patterns, to the identified figure, or target. Thereafter, the figure tracking system 144 determines the subsequent location of this same characteristic pattern, corresponding to the movement of the identified target as it moves about the camera's field of view. Manual figure tracking by the operator may be used in addition to, or in lieu of, the automated figure tracking system 144. In a busy scene, the operator may be better able to distinguish the target. In a manual figure tracking mode, the operator uses a mouse or other suitable input device to point to the target as it traverses the image on the display 180.

If camera 105 is adjustable, the controller 130 adjusts camera 105 to maintain the target figure in the center of the image from camera 105. That is, camera 105's line of sight and actual field of view will be adjusted to continue to contain the figure as the person moves along path P1 within camera 105's potential field of view. Soon after the person progresses along path P2, the person will no longer be within camera 105's potential field of view.

In accordance with this invention, based upon the determined location of the person and the determined field of view of each camera, the controller 130 selects camera 106 when the person enters camera 106's potential field of view. In a preferred embodiment that includes a figure tracking system 144, the figure tracking techniques will subsequently be applied to continue to track the figure in the image from camera 106. Similarly, the system in accordance with this invention will select camera 103, then camera 102, then camera 104, and then camera 102 again, as the person proceeds along the P3-P4-P5 path.

Figure 3A:
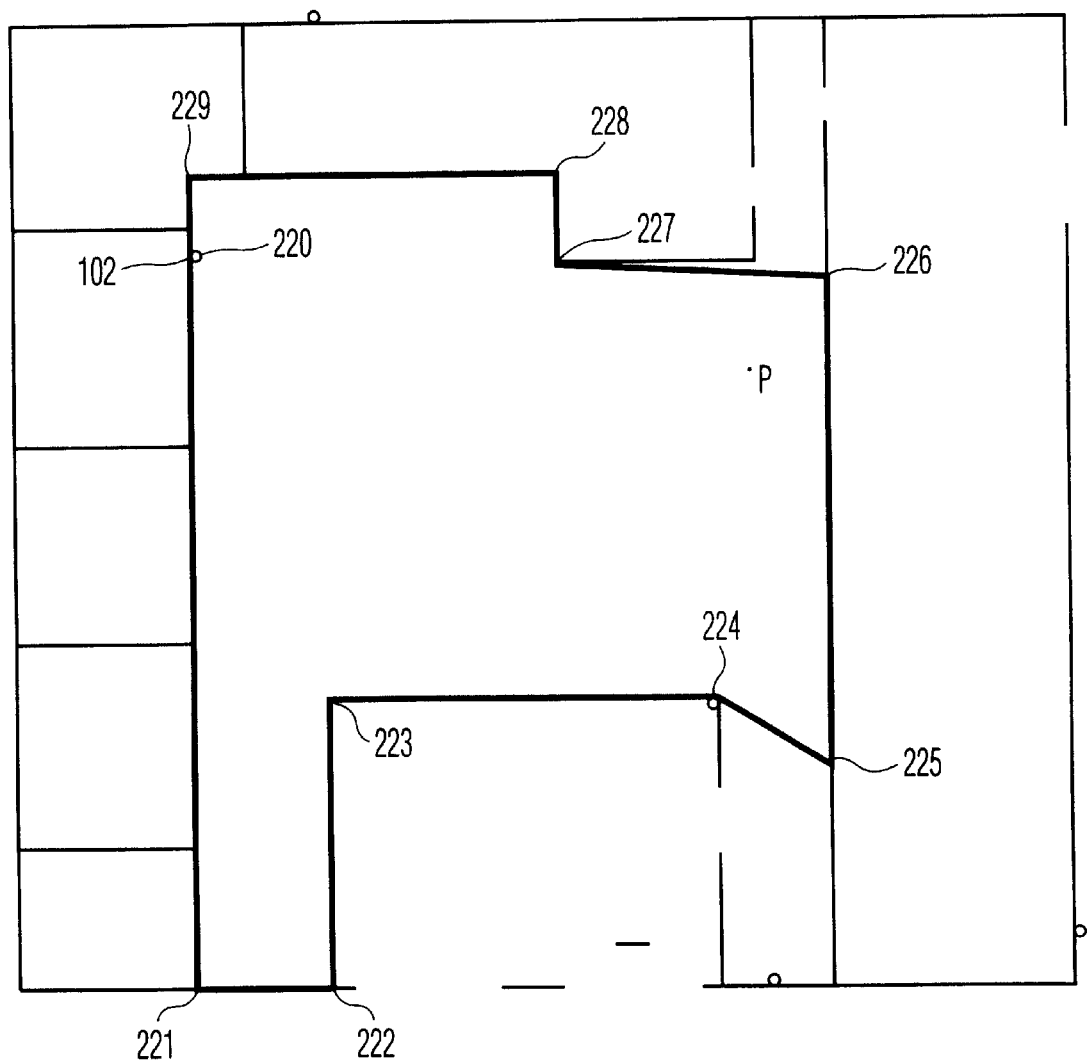
FIGS. 3a, 3b and 3c illustrate example field of view polygons associated with cameras in a multi-camera security system, in accordance with this invention.
Figure 3B:
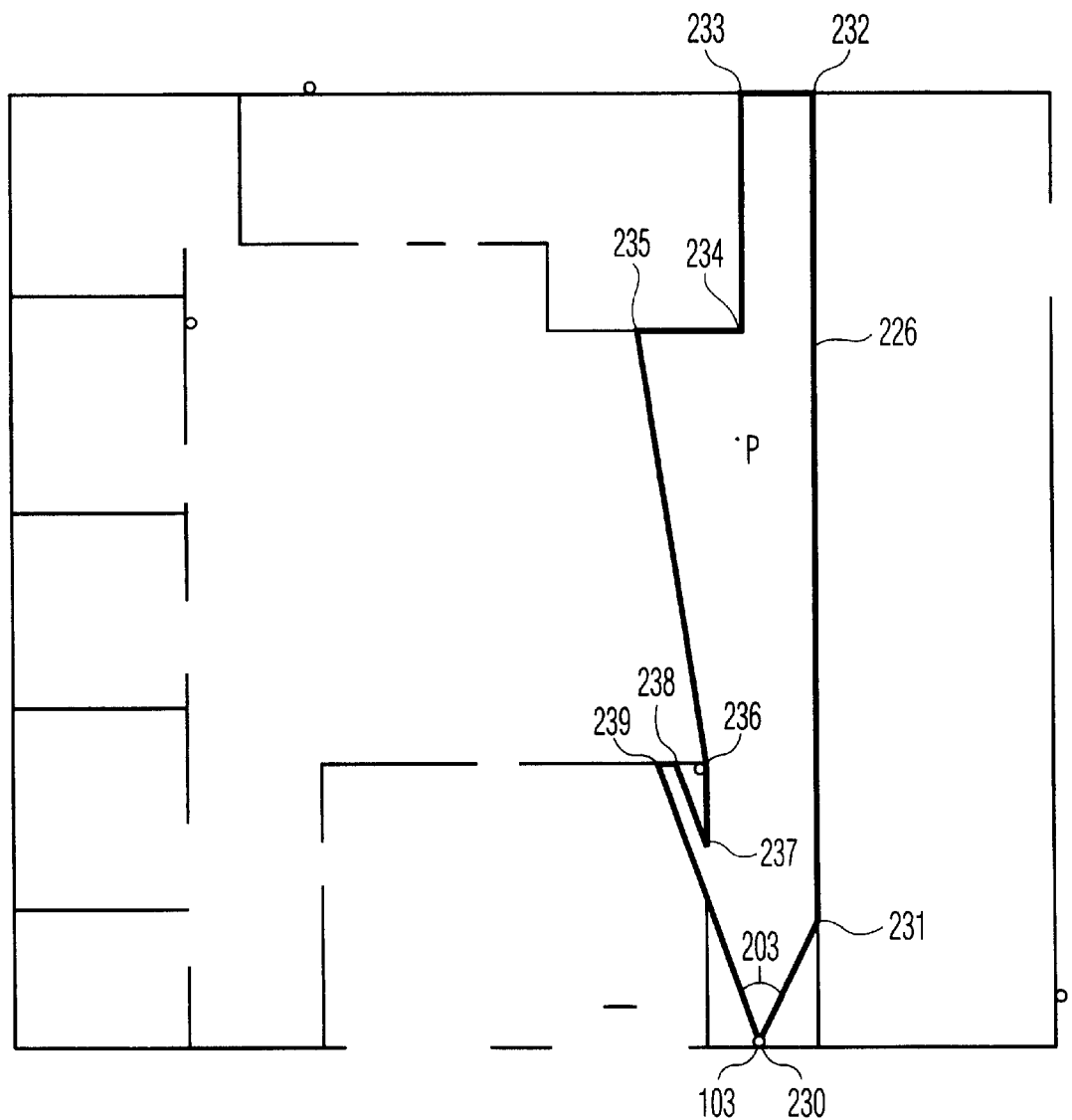
Figure 3C:
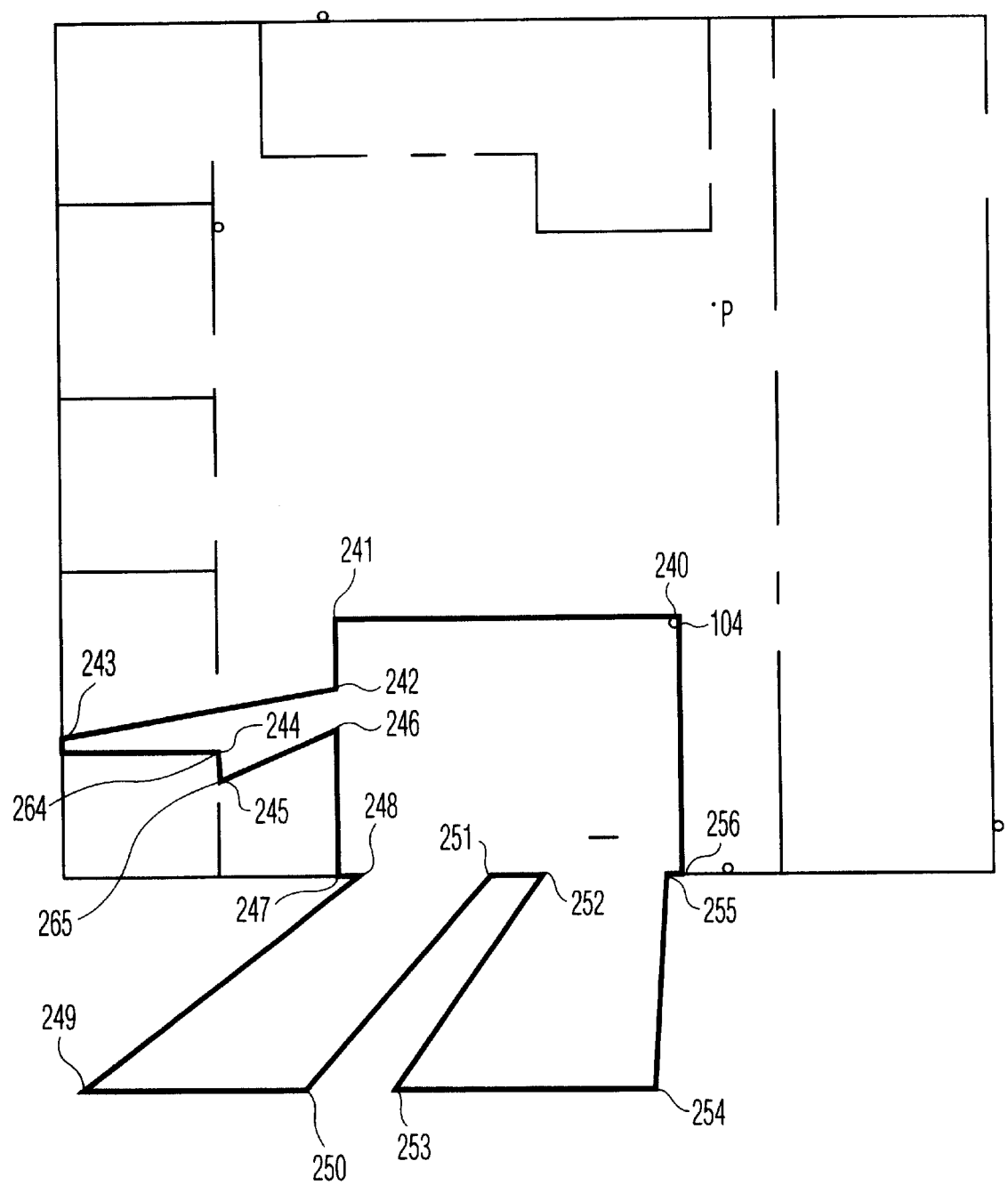

To effect this automatic selection of cameras, the camera handoff system 120 includes a representation of each camera's location and potential field of view, relative to each other. For consistency, the camera locations are provided relative to the site plan of the secured area that is contained in the secured area database 160. Associated with each camera is a polygon or polyhedron, outlining each camera's potential field of view. FIG. 3a illustrates the polygon associated with camera 102. FIG. 3b illustrates the polygon associated with camera 103. Camera 102 is a camera having an adjustable field of view, and thus can view any area within a full 360 degree arc, provided that it is not blocked by an obstruction. Camera 103 is a camera with a fixed field of view, as represented by the limited view angle 203. Camera 102's potential field of view is the polygon bounded by vertices 221 through 229. Camera 103's field of view is the polygon bounded by vertices 230–239. As shown, the field of view polygon can include details such as the ability to see through passages in obstructions, such as shown by the vertices 238 and 239 in FIG. 3b. Also associated with each camera is the location of the camera, shown for example as 220, 230, 240 in FIGS. 3a, 3b, 3c. The polygon representing the field of view of camera 104 is shown in FIG. 3c, comprising vertices 240 through 256. As shown in FIG. 3c, the field of view polygon can omit details, as shown by the use of vertices 244–245, omitting the actual field of view vertices 264–265. The level of detail of the polygons is relatively arbitrary; typically, one would provide the detail necessary to cover the maximum surveillance area within the secured area. If one area is coverable by multiple cameras, the need is minimal for identifying the fact that a particular camera can also view that area by viewing through a doorway. Conversely, if the only view of an area is through such a doorway, the encoding of the polygon to include this otherwise uncovered area may be worthwhile. Similarly, although an unobstructed view of a camera is infinite, polygon bounds can be defined to merely include the area of interest, as shown for example in FIG. 3c, where the bounds 249–250 and 253–254 are drawn just beyond the perimeter of the area being secured.

Figure 4:
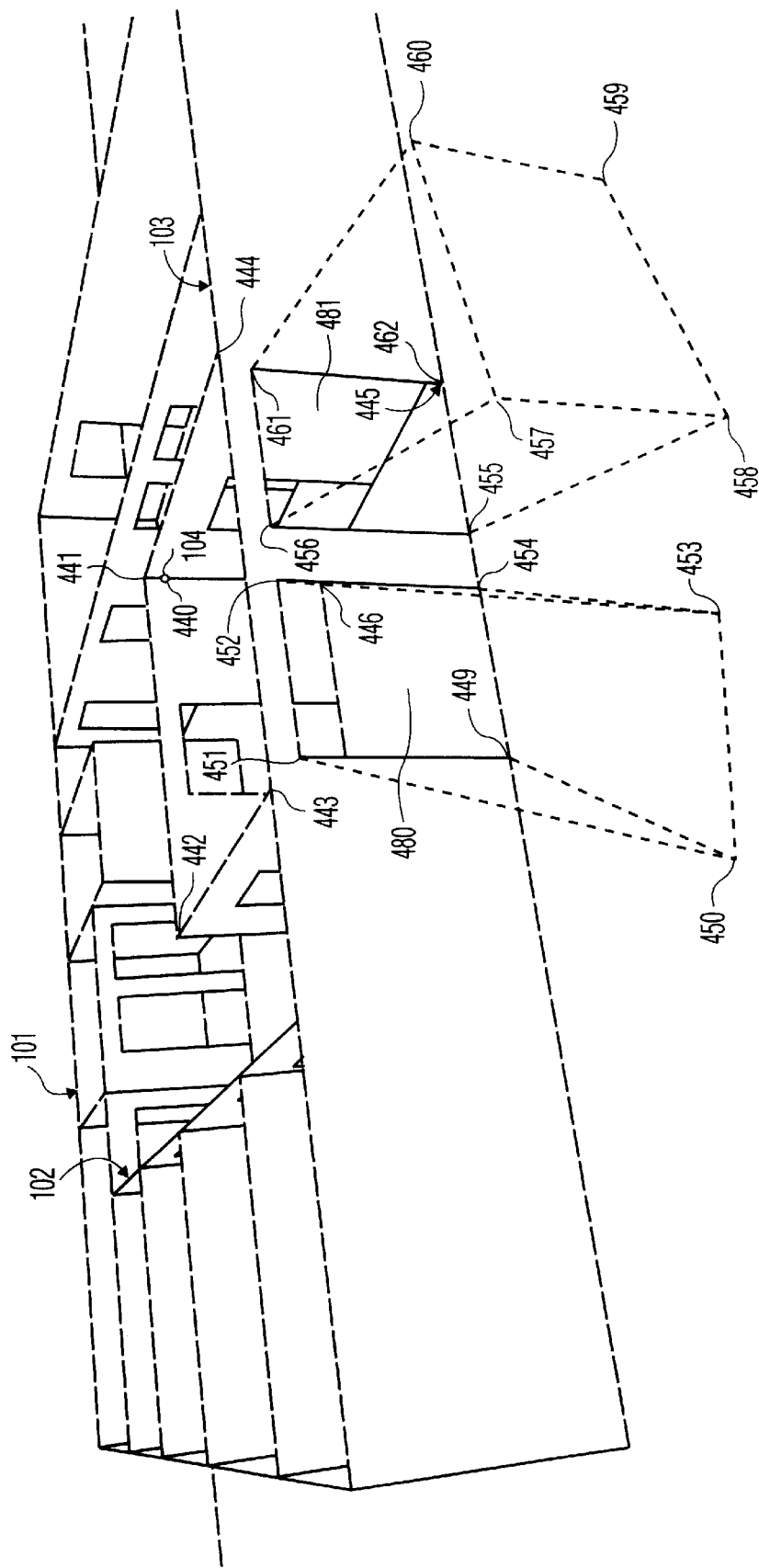
FIG. 4 illustrates an example three dimensional representation of a secured area and a camera's field of view polyhedron, in accordance with this invention.

The site map may also be represented as a three dimensional model, as shown in FIG. 4. In a three dimensional model, the cameras' fields of view are represented by polyhedron, to include the three-dimensional nature of a camera's field of view. The polyhedron associated with camera 104 is shown in FIG. 4, and is represented by the vertices 441 through 462. As discussed above, the detail of the polyhedron model is dependent upon the level of precision desired. For example, vertices 449 through 454 model the view through the portal 480 as a wedge shaped area, whereas vertices 455 through 462 model the view through the portal 481 as a block shaped area. Three dimensional modeling will provide for greater flexibility and accuracy in the determination of actual location of the target, but at increased computational costs. For ease of understanding, two dimensional modeling will be discussed hereafter. The techniques employed are equally applicable to three dimensional site maps, as would be evident to one skilled in the art.

The coordinate system utilized for encoding the camera locations and orientations can be any convenient form. Actual dimensions, relative to a reference such as the floor plan, may be used; or, scaled dimensions, such as screen coordinates may be used. Techniques for converting from one coordinate system to another are well known to one skilled in the art, and different coordinate systems may be utilized as required. Combinations of three dimensional modeling and two dimensional modeling may also be employed, wherein for example, the cameras at each floor of a multistoried building are represented by a two dimensional plan, and each of these two dimensional plans have a third, elevation, dimension associated with it. In this manner, the computationally complex process of associating an image to a physical locale can operate in the two dimensional representation, and the third dimension need only be processed when the target enters an elevator or stairway.

Figure 5A:
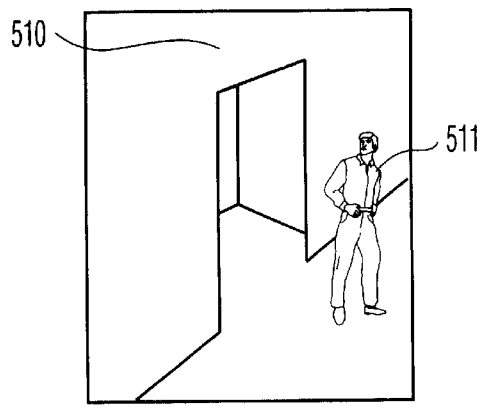
FIGS. 5a, 5b and 5c illustrate an example of the association between a figure in an image from a camera and the physical representation of the secured area, in accordance with this invention.
Figure 5B:
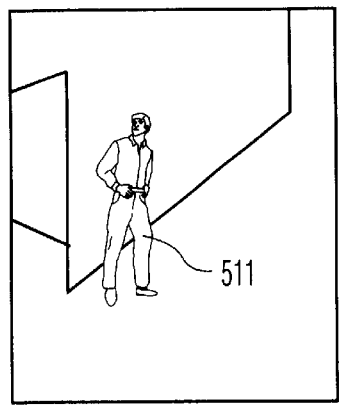
Figure 5C:
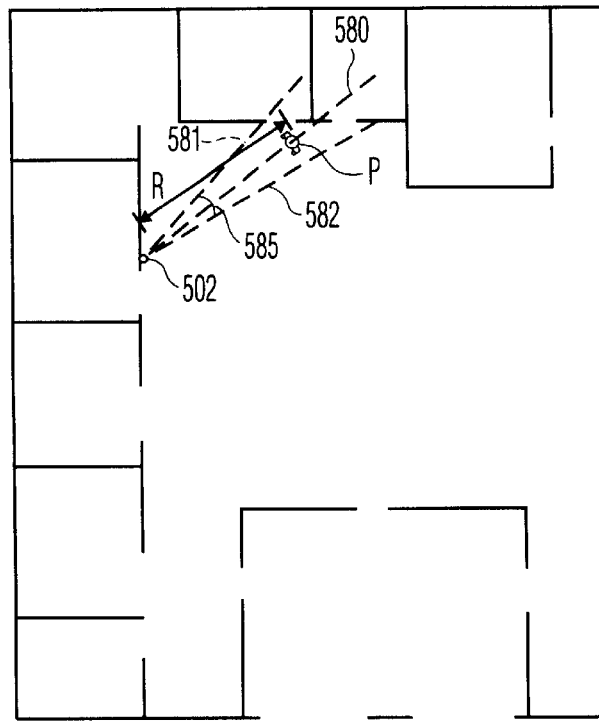

FIGS. 5a–5c demonstrates the association of a figure in an image to a target in the physical coordinate system, in accordance with this invention. An image 510 from camera 502 (shown in FIG. 5c), containing a figure 511, is shown in FIG. 5a. As discussed above, figure tracking processes are available that determine a figure's location within an image and allows a camera control system to adjust camera 502's line of sight so as to center the figure in the image, as shown in FIG. 5b. The controller 130 in accordance with this invention will maintain the camera 502's actual line of sight, in terms of the physical site plan, for subsequent processing. If the camera is not adjustable, the line of sight from the camera to the figure is determined by the angular distance the figure is offset from the center of the image. By adjusting the camera to center the figure, a greater degree of accuracy can be achieved in resolving the actual line of sight to the figure. With either an adjustable or non adjustable camera, the direction of the target from the camera, in relation to the physical site plain, can thus be determined. For ease of understanding, the line of sight is used herein as the straight line between the camera and the target in the physical coordinate site plan, independent of whether the camera is adjusted to effect this line of sight.

FIG. 5c illustrates the physical representation of a secured area, as well as the location of camera 502, the line of sight 580 to the target, and the camera's actual field of view, as bounded by rays 581 and 582 about an angle of view 585.

To determine the precise location of the target along the line of sight 580, two alternative techniques can be employed: triangulation and ranging. In triangulation, if the target is along the line of sight of another camera, the intersection of the lines of sight will determine the target's actual location along these lines of sight. This triangulation method, however, requires that the target lie within the field of view of two or more cameras. Alternatively, with auto-focus techniques being readily available, the target's distance (range) from the camera can be determined by the setting of the focus adjustment to bring the target into focus. Because the distance of the focal point of the camera is directly correlated to the adjustment of the focus control on the camera, the amount of focus control applied to bring the target into focus will provide sufficient information to estimate the distance of the target from the location of the camera, provided that the correlation between focus control and focal distance is known. Any number of known techniques can be employed for modeling the correlation between focus control and focal distance. Alternatively, the camera itself may contain the ability to report the focal distance, directly, to the camera handoff system. Or, the focal distance information may be provided based upon independent means, such as radar or sonar ranging means associated with each camera.

In the preferred embodiment, the correlation between focus control and focal distance is modeled as a polynomial, associating the angular rotation x of the focus control to the focal distance R as follows:

$$R = a_0 + a_1 x + a_2 x^2 + \ldots + a_n X^n.$$

The degree n of the polynomial determines the overall accuracy of the range estimate. In a relatively simple system, a two degree polynomial (n=2) will be sufficient; in the preferred embodiment, a four degree polynomial (n=4) is found to provide highly accurate results. The coefficients ao through an are determined empirically. At least n+1 measurements are taken, adjusting the focus x of the camera to focus upon an item place at each of n+1 distances from the camera. Conventional least squares curve fitting techniques are applied to this set of measurements to determine the coefficients $a_0$ through $a_n$. These measurements and curve fitting techniques can be applied to each camera, to determine the particular polynomial coefficients for each camera; or, a single set of polynomial coefficients can be applied to all cameras having the same auto-focus mechanism. In a preferred embodiment, the common single set of coefficients are provided as the default parameters for each camera, with a capability of subsequently modifying these coefficients via camera specific measurements, as required.

If the camera is not adjustable, or fixed focus, alternative techniques can also be employed to estimate the range of the target from the camera. For example, if the target to be tracked can be expected to be of a given average physical size, the size of the figure of the target in the image can be used to estimate the distance, using the conventional square law correlation between image size and distance. Similarly, if the camera's line of sight is set at an angle to the surface of the secured area, the vertical location of the figure in the displayed image will be correlated to the distance from the camera. These and other techniques are well known in the art for estimating an object's distance, or range, from a camera.

Given the estimated distance from the camera, and the camera's position and line of sight, the target location P, in the site plan coordinate system, corresponding to the figure location in the displayed image from the camera, can be determined. Given the target location P, the cameras within whose fields of view the location P lies can be determined. This is because the cameras' fields of view are modeled in this same coordinate system. Additionally, the cameras whose fields of view are in proximity to the location P can also be determined.

At option, each of the cameras including the target point can be automatically adjusted to center the target point in their respective fields of view, independent of whether the camera is selected as the camera utilized for figure tracking. In the preferred embodiment, all cameras which contain the target in their potential field of view, and which are not allocated to a higher priority task, are automatically redirected to contain the target in their actual field of view.

Note that while automated figure tracking software is utilized in the preferred embodiment, the techniques presented herein are also applicable to a manual figure tracking scenario as well. That is, for example, the operator points to a figure in the image from a camera, and the system determines the line of sight and range as discussed above. Thereafter, knowing the target location, the system displays the same target location from the other cameras, automatically. Such a manual technique would be useful, for example, for managing multiple cameras in a sports event, such that the operator points to a particular player, and the other cameras having this player in their field of view are identified for alternative selection and/or redirection to also include this player.

A variety of techniques may be employed to determine whether to select a different camera from the one currently selected for figure tracking, as well as techniques to select among multiple cameras. Selection can be maintained with the camera containing the figure until the figure tracking system 144 reports that the figure is no longer within the view of that camera; at that time, one of the cameras which had been determined to have contained the target in its prior location P can be selected. The camera will be positioned to this location P and the figure tracking system 144 will be directed to locate the figure in the image from this camera. The assumption in this scenario is that the cameras are arranged to have overlapping fields of view, and the edges of these fields of view are not coincident, such that the target cannot exit the field of view of two cameras simultaneously.

In a preferred system, rather than utilizing the prior location P, the camera handoff system includes an predictor 142 that estimates a next location Q, based upon the motion (sequence of prior locations) of the figure. A linear model can be used, wherein the next location is equal to the prior location plus the vector distance the target traveled from its next-prior location. A non-linear model can be used, wherein the next location is dependent upon multiple prior locations, so as to model both velocity and acceleration. Typically, the figure tracking system 144 locations exhibit jitter, or sporadic deviations, because the movement of a figure such as a person, comprising arbitrarily moving appendages and relatively unsharp edges, is difficult to determine absolutely. Data smoothing techniques can be applied so as to minimize the jitter in the predictive location Q, whether determined using a linear or non-linear model. These and other techniques of motion estimation and location prediction are well known to those skilled in the art.

Given a predicted location Q, in the site map coordinate system, the cameras containing the point Q within their potential fields of view can be determined. If the predicted location Q lies outside the limits of the current camera's potential field of view, an alternative camera, containing location Q in its field of view, is selected and adjusted so as to provide the target in its actual field of view. The system need not wait until the predicted location is no longer within the current camera's field of view; if the predicted location Q is approaching the bounds of the selected camera's field of view, but well within the bounds of another camera's field of view, the other camera can be selected. Similarly, the distance from each camera can be utilized in this selection process. As is common in the art, a weighting factor can be associated with each of the parameters associated with the viewing of a security scene, such as the distance from the camera, the distance from the edge of the camera's field of view, the likelihood that the target will be locatable in the camera's field of view (influenced, for example, by the complexity of image from one camera versus that from another), whether this camera is currently selected, etc. Using these weighting factors, the preference for selecting the camera can be determined, and the most preferred camera can be selected and adjusted.

Hereinafter, without loss of generality, target location P will be used to identify the location to which a camera is intended to be directed, regardless of whether this location P is the prior location or estimated next location.

If another camera cannot be found which contains the location P, a camera with a field of view in the proximity of the location P can be selected, and the figure tracking system 144 directed to attempt to locate the figure in the subsequent images from this camera. To optimize the likelihood of success in selecting a camera that contains the figure, a variety of techniques can be employed. Each camera can contain a list of those cameras having a potential field of view in proximity to its potential field of view. This list would exclude cameras whose fields of view are in proximity to its field of view, but which fields of views are physically separated and inaccessible from its field of view; for example a camera in an adjacent room, to which there is no access from this camera's room. Similarly, the list could be segregated by sub-areas within the camera's field of view, so as to include only those cameras having fields of view with direct access from each of the sub areas within the camera's field of view. For example, with reference to FIG. 2, cameras 102 and 103 have adjacent fields of view to camera 104's field of view. The list associated with camera 104 would contain both cameras 102 and 103, but may be structured such that, if the target point lies to the left of the middle of camera 104's potential field of view, camera 102 is identified as the next camera to be utilized; if the target lies to the right of camera 104's potential field of view, camera 103 is identified as the next camera to be utilized.

In addition to explicit list and sorting techniques, common to those skilled in the art, Expert System approaches to the identification and selection of subsequent actions can be employed. For example, given that the target is within a particular area in the site plan, the egresses from the area can be determined from the site plan, and the most likely egress identified based upon the pattern of activity of the target, or upon a model of likelihood factors associated with each egress point. For example, the route from the lobby of a bank to the bank's vault would have a high likelihood of use when the target first enters a bank. The bank exit would have a low likelihood of intended use at this time. But, these likelihoods would reverse once the target returns from the vault.

Figure 6A:
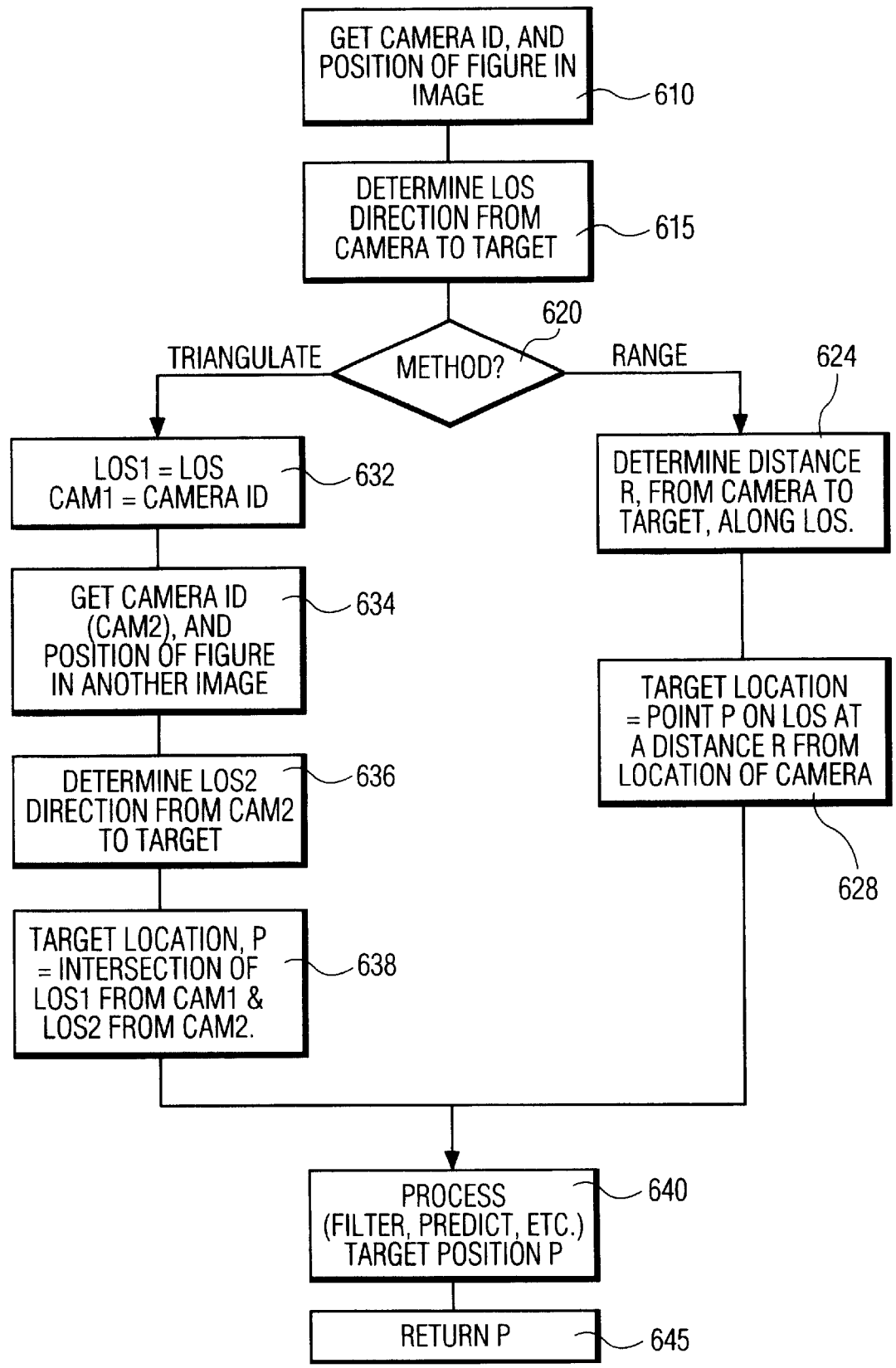
FIGS. 6a and 6b illustrate example flowcharts for the automated camera handoff process in accordance with this invention.
Figure 6B:
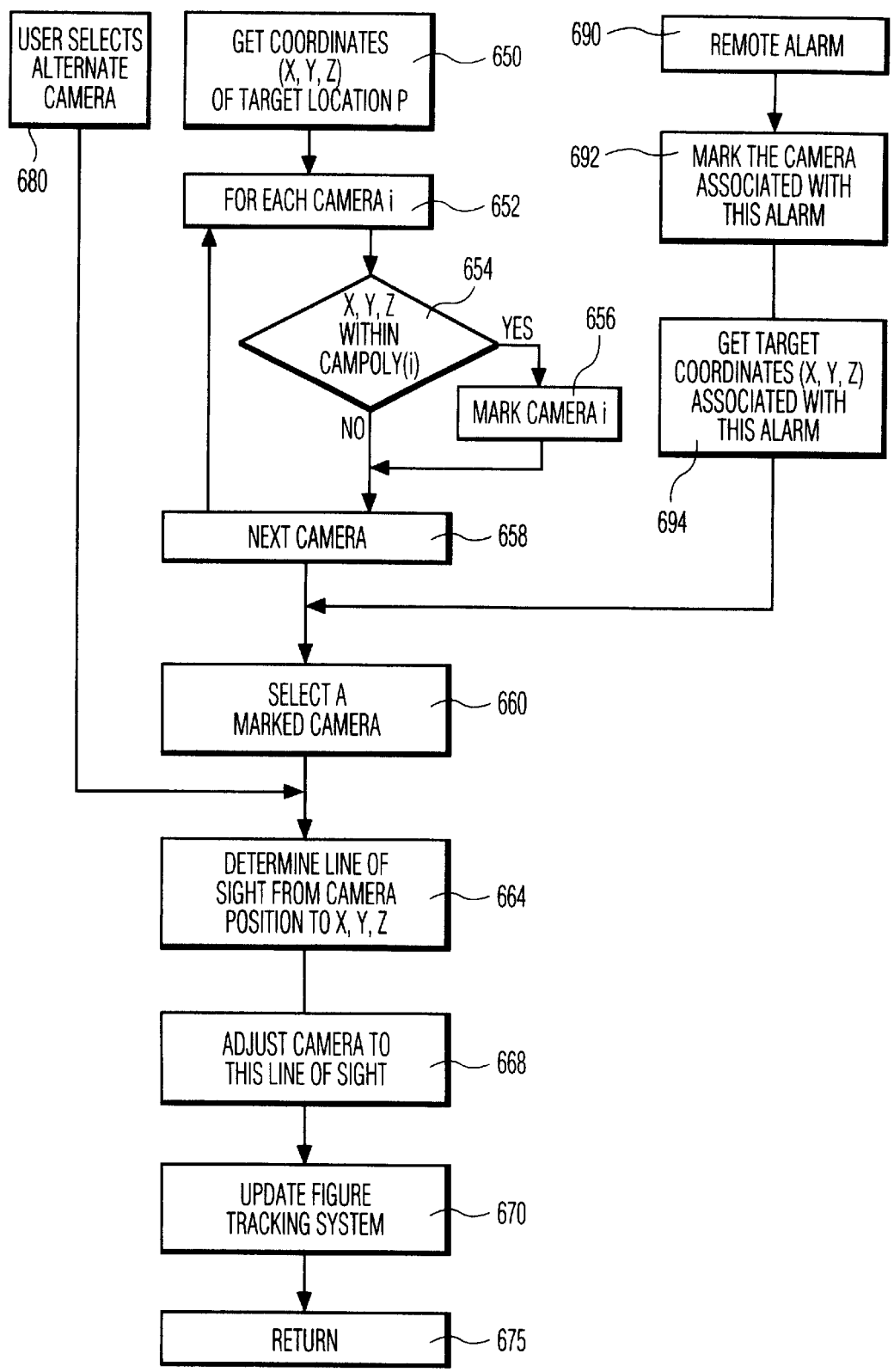

FIG. 6a illustrates a flowchart for associating the position of a figure in an image, as reported by a figure tracking system, to the location of a target in the physical site plan coordinate system. FIG. 6b illustrates a flowchart for selecting a camera whose field of view contains this target location.

In FIG. 6a, the position of the figure within an image, and an identification of the camera providing this image, is provided by the figure tracking system and controller, at 610. The position of the image relative to the orientation of the camera determines the line of sight, LOS, from the camera to the target, in the physical coordinate space, at 615. The orientation of the camera, in the physical coordinate space, is determined when the camera is initially installed. If the camera is not adjustable, the direction the camera is aimed, in the physical domain, is the orientation of the camera. If the camera is adjustable, the initial orientation is determined by aiming the camera at a point having a known location in the physical representation of the secured site, such as a corner; subsequent rotations of the camera will then be relative to this known direction.

To determine the location of the target along the determined line of sight LOS, either ranging or interpolation methods may be employed, at 620. If the range method is used, the distance between the camera and the target is determined, at 624, using the methods discussed above. The target location P, in the physical domain, is determined, at 628, as the point along the LOS at a distance R from the camera's location.

If a triangulation method is utilized, the line of sight is stored as LOS1, at 632, and another image is assessed by the target tracking system to provide a position relative to another camera's image, at 634. The line of sight LOS2 relative to this second camera is determined, at 636. The target location P, in the physical domain, is determined at 638 as the point at the intersection of the line LOS1 from the first camera's location and the line LOS2 from the second camera's location.

As discussed above, in the preferred embodiment, this target location is processed, at 640, so as to produce a predicted next position, or filtered to remove jitter, or a combination of both. The processed target location P is returned, at 645, for presentation to the camera selection process of FIG. 6b.

FIG. 6b illustrates a flowchart for identifying and selecting a camera containing the target point P. Given the target point P, in the physical domain coordinate system, at 650, the camera handoff system in accordance with this invention determines which cameras contain this target point in the loop 652–658. Because each camera's potential field of view is represented as vertices in the physical domain coordinate system, the process merely comprises a determination of whether point P lies within the polygon or polyhedron (CamPoly) associated with each camera. If the number of cameras is large, this search process can be optimized, as discussed above. The search process employed would replace this exhaustive search loop at 652–658.

The system thereafter selects one of the cameras containing the target point P in its potential field of view, at 660. As discussed above, a variety of techniques may be employed to select from among a number of cameras, typically with the current camera being given selection preference, to avoid a continual change of cameras and views. If no camera contains target point P, the aforementioned predictive techniques can be applied to identify a new target point; alternatively, the closest camera to the target point can be selected. Once a camera is selected, its actual field of view is adjusted so as to contain the target point at the center of its image, at 664–668. Any changes in camera selection or orientation are communicated to the figure tracking system, at 670, and the process returns, at 675.

In a further embodiment, the system comprises alarms, each alarm having an associated camera and predefined target point, in the physical domain coordinate system. Upon receipt of an alarm, at 690, the system marks the associated camera for selection, at 692. The target point P is set to the associated predefined target point, at 694, and the process continues, as discussed above, at 660. Optionally, the system could signal the figure tracking system that a new target is to be identified, by noting movements in proximity to this target point in subsequent images; or, the operator, having been altered to the alarm and presented the image at the target point, could outline the figure directly. Thereafter, the system will track the figure, selecting alternate cameras to maintain the tracking, as discussed above.

For completeness, the user's ability to override the camera handoff system's selection is shown, at 680. Provided that the system provides a preference to select the currently selected camera, to minimize changing images, at 660, the user selected camera will thereafter be the currently selected camera for subsequent camera selection until the figure is no longer in the selected camera's potential field of view.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A camera handoff system comprising:

a location determinator that determines a location of a figure that is within an image from a first camera based on a location and an orientation of the first camera, a field of view determinator that determines a field of view of a second camera based on a location and an orientation of the second camera, and a controller, operably coupled to the location determinator and the field of view determinator, said controller selecting the second camera based at least partially upon whether the location of the figure is within the field of view of the second camera, wherein the location determinator includes a predictor that determines a predicted location of the figure based on a one or more prior locations of the figure, the location of the figure being at least partially based on this predicted location.

2. The camera handoff system of claim 1, wherein the controller includes:

means for determining a target angle between the second camera and the location of the figure, and means for orienting the second camera to said target angle.

3. The camera handoff system of claim 1, wherein the location determinator includes a figure tracking system.

4. The camera handoff system of claim 1, wherein the controller includes means for selecting and orienting the first camera in dependence upon an alarm signal from a sensor.

5. The camera handoff system of claim 1, wherein the selection of the second camera is also based on at least one of the following:
- a proximity of a field of view of the first camera with the field of view of the second camera;
- a likelihood of egress from the field of view of the first camera to the field of view of the second camera; and
- obstructions between the field of view of the first camera and the field of view of the second camera.

6. The camera handoff system of claim 1, wherein the location determinator includes:
- means for identifying an image location corresponding to the figure within the image from the first camera,
- means for determining a line of sight between the first camera and the figure based on the image location, and
- means for determining a distance between the first camera and the figure; whereby the location of the figure corresponds to a point that is at the distance from the image location of the first camera along the line of sight.

7. The camera handoff system of claim 6, wherein the means for identifying the image location is a figure tracking system.

8. The camera handoff system of claim 7, wherein the controller includes means for selecting and orienting the first camera in dependence upon an alarm signal from a sensor.

9. The camera handoff system of claim 8, wherein the controller further includes:
- means for determining a target angle between the second camera and the location of the figure, and
- means for orienting the second camera to this target angle.

10. A security system for monitoring a secured area, comprising:
- a plurality of cameras, each camera having a location and field of view within the secured area,
- a monitor for viewing an image from a selected camera of the plurality of cameras, the selected camera having an orientation angle relative to the secured area,
- means for identifying a portion of the image as a target, the portion of the image corresponding to an item within the selected camera's field of view, the item having a location within the secured area, and the target having a location within the image,
- means for determining the linear distance between the selected camera's location and the item's location,
- means for determining the angular distance between the selected camera's orientation and the item's location, in dependence upon the location of the target within the image,
- means for determining the item's location in dependence upon the determined linear distance and angular distance, relative to the camera's location,
- means for selecting an other camera of the plurality of cameras in dependence upon the determined item's location and the other camera's field of view within the secured area.

11. The security system of claim 10, further including:
- means for determining a target angle between the other camera and the location of the item, and
- means for orienting the second camera to this target angle.

12. The camera handoff system of claim 10, wherein the means of identifying the portion of the image as the target includes a figure tracking system.

13. The camera handoff system of claim 10, further including means for selecting and orienting the selected camera in dependence upon an alarm signal from a sensor.

14. A method for selecting a second camera based on an image from a first camera, including the steps of:
- identifying a target figure in the image from the first camera,
- determining a target location of the target figure based on a location and an orientation of the first camera,
- determining a field of view of the second camera based on a location and an orientation of the second camera,
- selecting the second camera based upon whether the target location is within the field of view of the second camera,
- identifying an image location corresponding to the target figure,
- determining a line of sight between the first camera and the target figure based on the image location,
- determining a distance between the first camera and the target figure, and
- determining the target location as a point that is at the distance from the location of the first camera along the line of sight.

15. The method of claim 14, further including the steps of:
- determining a target angle between the second camera and the target location, and
- orienting the second camera to this target angle.

16. The method of claim 14, wherein the step of identifying the target figure includes the steps of:
- identifying a portion of a first frame of the image as a target image,
- determining characteristics of the target image, and
- identifying the target figure as a portion of a second frame of the image that has the characteristics of the target image.

17. The method of claim 14, wherein the step of identifying the target figure includes the steps of:
- identifying a portion of a first frame of the image as a target image,
- determining characteristics of the target image, and
- identifying the target figure as a portion of a second frame of the image that has the characteristics of the target image.

18. The method of claim 14, further including the steps of:
- determining a target angle between the second camera and the location of the figure, and orienting the second camera to this target angle.

* * * * *